(12) United States Patent
Gao et al.

(10) Patent No.: US 8,990,684 B2
(45) Date of Patent: Mar. 24, 2015

(54) SYSTEM AND METHOD FOR RECOMMENDING FONTS

(75) Inventors: Jie Gao, Hangzhou (CN); Wen Chao Ji, Hangzhou (CN)

(73) Assignee: Alibaba Group Holding Limited (KY)

( * ) Notice: Subject to any disclaimer, the term of this patent is extended or adjusted under 35 U.S.C. 154(b) by 340 days.

(21) Appl. No.: 13/495,331

(22) Filed: Jun. 13, 2012

(65) Prior Publication Data

US 2012/0324351 A1 Dec. 20, 2012

(30) Foreign Application Priority Data

Jun. 15, 2011 (CN) .......................... 2011 1 0160159

(51) Int. Cl.
*G06F 17/00* (2006.01)
*G06F 17/30* (2006.01)
*G06F 17/21* (2006.01)

(52) U.S. Cl.
CPC ........ *G06F 17/30905* (2013.01); *G06F 17/214* (2013.01); *G06F 17/3089* (2013.01)
USPC ............ 715/269; 715/250; 715/234; 715/760

(58) Field of Classification Search
CPC ........................... H04L 51/046; G06F 17/214
USPC .................................. 715/250, 234, 760, 269
See application file for complete search history.

(56) References Cited

U.S. PATENT DOCUMENTS

| | | | |
|---|---|---|---|
| 7,752,328 B2 * | 7/2010 | Mortimore et al. ........... 709/231 |
| 7,865,513 B2 * | 1/2011 | Welch et al. .................. 707/758 |
| 8,386,519 B2 | 2/2013 | Kenedy et al. | |
| 8,417,503 B2 * | 4/2013 | Bernstein et al. ............... 703/14 |
| 8,447,751 B2 * | 5/2013 | Stouffer et al. ............... 707/709 |
| 8,498,990 B2 * | 7/2013 | Heber ........................... 707/748 |
| 8,677,234 B2 * | 3/2014 | Underwood et al. ......... 715/250 |
| 2002/0059339 A1 * | 5/2002 | McCormick et al. ....... 707/500.1 |
| 2003/0065643 A1 | 4/2003 | Musgrove et al. | |
| 2004/0041818 A1 * | 3/2004 | White et al. .................. 345/619 |

(Continued)

FOREIGN PATENT DOCUMENTS

| | | |
|---|---|---|
| CN | 101196917 | 6/2008 |
| JP | 2000209519 | 7/2000 |

(Continued)

OTHER PUBLICATIONS

Hicks, "Design Impact: Emotional Web Design", Blog by Sarah Lynn Design, May 1, 2011. Retrieved Dec. 4, 2012 http://www.sarahlynndesign.com/blog/article/emotional-web-design.

(Continued)

*Primary Examiner* — William Titcomb
(74) *Attorney, Agent, or Firm* — Van Pelt, Yi & James LLP

(57) ABSTRACT

Recommending fonts includes obtaining a product category and determining whether a font recommendation should be made. In the event that the font recommendation should be made, the technique further includes determining a recommended font that corresponds to the product category, the determination being based at least in part on a plurality of predetermined correspondences, the plurality of predetermined correspondences indicating associations between a plurality of product categories and a respective plurality of fonts, and outputting information pertaining to the recommended font.

20 Claims, 9 Drawing Sheets

(56) References Cited

U.S. PATENT DOCUMENTS

| | | |
|---|---|---|
| 2006/0136308 A1* | 6/2006 | Ratchford ................. 705/26 |
| 2006/0253345 A1* | 11/2006 | Heber ...................... 705/27 |
| 2006/0287913 A1 | 12/2006 | Baluja |
| 2009/0058860 A1* | 3/2009 | Fong et al. ................. 345/467 |
| 2010/0042932 A1* | 2/2010 | Lehtiniemi et al. ........ 715/747 |
| 2010/0083077 A1* | 4/2010 | Paulsen et al. ............. 715/202 |
| 2010/0205551 A1* | 8/2010 | Underwood et al. ....... 715/760 |
| 2010/0306644 A1* | 12/2010 | Underwood et al. ....... 715/234 |
| 2011/0270888 A1* | 11/2011 | Crochet et al. ............. 707/794 |
| 2011/0289407 A1* | 11/2011 | Naik et al. ................. 715/269 |
| 2014/0223475 A1* | 8/2014 | Mcintire et al. ............ 725/34 |

FOREIGN PATENT DOCUMENTS

| | | |
|---|---|---|
| JP | 2002183032 | 6/2002 |
| JP | 2004110384 | 4/2004 |

OTHER PUBLICATIONS

Natalie Meyer. E-commerce interface design parameters and their relation to website popularity. Diss. University of Pretoria, 2008.

\* cited by examiner

SYSTEM AND METHOD FOR RECOMMENDING FONTS

CROSS REFERENCE TO OTHER APPLICATIONS

This application claims priority to People's Republic of China Patent Application No. 201110160159.6 entitled METHOD OF SELECTING FONTS AND DETERMINING, RECOMMENDING AND GENERATING FONTS AND EQUIPMENT FOR SAME filed Jun. 15, 2011 which is incorporated herein by reference for all purposes.

FIELD OF THE INVENTION

The present application relates to the field of computer technology. In particular, it relates to a method and system for recommending fonts.

BACKGROUND OF THE INVENTION

In addition to providing descriptions, text is often used to beautify user interfaces and to optimize users' visual experience at websites. In some cases, text may even be used as images. Large and visually appealing fonts can be applied to commonly used text to attract the attention of users. Such fonts can also serve to enhance the meaning of the text on a webpage and increase demand for products described on the webpage.

Many webpage designers, however, lack the design knowledge to properly select the fonts that would best express the information on their webpages. Thus, the pages they create may offer poor user experience, which can lead to lower transaction rates.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and a system for recommending fonts are disclosed. One embodiment of the invention relates to a server that predetermines one or more fonts that correspond to a product category. In accordance with an aspect of the present embodiment, recommending fonts includes receiving a product category from the seller-user and recommending one or more fonts that correspond to the product category based at least in part on predetermined correspondences between product categories and fonts. In some embodiments, the server receives from a seller-user product webpages, and the server determines if the product categories of products included in the product webpage and the fonts used in the product webpage satisfy predetermined correspondences between product categories and fonts. In some embodiments, the server recommends at least one font that corresponds to the product category to the seller-user if the seller-user had submitted a product webpage that does not satisfy any predetermined correspondences.

Figure 1:
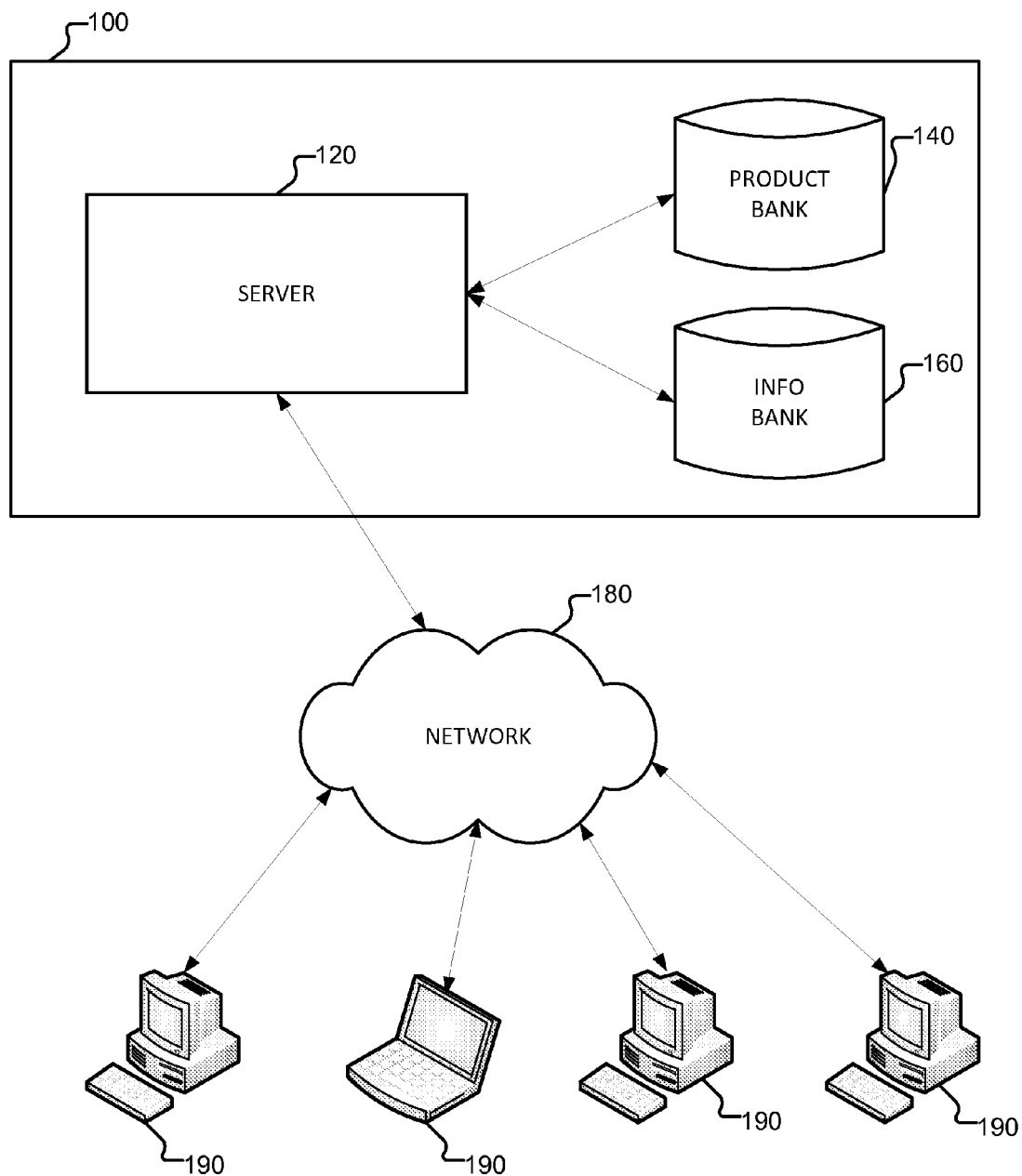
FIG. 1 is a system diagram depicting an embodiment of the font recommendation system.

FIG. 1 is a system diagram depicting an embodiment of a font recommendation system 100.

In the example shown, font recommendation system 100 includes a server 120, a product bank 140, and an information bank 160. In some embodiments, server 120 includes one or more devices having one or more processors coupled to one or more memories. In various embodiments, server 120 includes one or more interfaces configured to receive user inputs, such as user inputs sent by client devices 190 over network 180, which may be the Internet or other communications network. Examples of a communication interface include, without limitations, external connections such as a port, cable, wired or wireless network interface card, etc., and internal connections such as a communication bus. In some embodiments, the client device is a computing device such as a computer or mobile device with networking capabilities. In some embodiments, server 120 has access to the product bank 140. In various embodiments, product bank 140 is a database that stores product keywords, product categories, and relationships between product keywords and categories. In some embodiments, server 120 also has access to the information bank 160. In some embodiments, information bank 160 is a database that stores predetermined correspondences between product categories and fonts.

Figure 2:
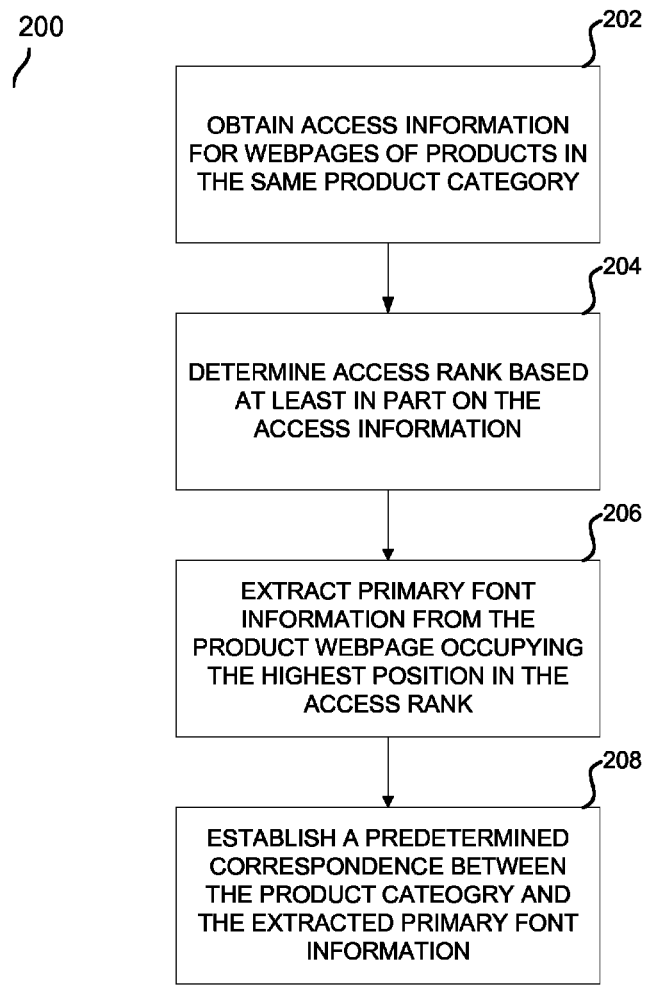
FIG. 2 is a flow diagram depicting an embodiment of the process for establishing predetermined correspondences between product categories and fonts.

FIG. 2 is a flow diagram depicting an embodiment of the process 200 for establishing predetermined correspondences between product categories and fonts. In some embodiments, available Chinese and English fonts are derived from existing typefaces such as Kaiti, Songti, Youyuan, Times New Roman, Arial, and Calibri. In some embodiments, process 200 is performed on a system such as system 100 (e.g., server 120) of FIG. 1.

At 202, access information for webpages of products under the same product category is obtained. In some embodiments, access information includes the total page views (e.g., how many times a page has been viewed) and the transaction record (e.g., number of purchases) associated with each of the product webpages. In some embodiments, access information includes the mean browsing time (e.g., average duration of time that a page is viewed) for each product webpage. In some embodiments, access information includes the total page view, the transaction record, and the mean browsing time associated with each of the product webpages. In some embodiments, the access information is retrieved from the information bank 160.

At 204, an access rank is determined based at least in part on the access information obtained at 202. As used herein, an access rank reflects an ordering of product webpages sorted based on access information for each product webpage, such as total page view, transaction record, and mean browsing time.

In some embodiments, where access information includes total page view and transaction record, the server first determines a transaction rate based on the total page view and the transaction record, and then determines an access rank based on transaction rates. For example, products A, B, and C are all products listed under the "Women's Apparel" product category. The total page view for the webpage of product A is 100 and product A has accrued a total of 10 transactions. Product B's webpage has a total of 100 page views and product B has a total of 20 transactions. Product C has a total of 120 page views and a total of 60 transactions. In this case, the respective transaction rates for product webpages A, B, and C are 10%, 20%, and 50%. The transaction rates are compared and sorted to form an access rank. In this case, the access rank is webpage C>webpage B>webpage A.

In some embodiments, where access information includes mean browsing time, the server determines an access rank based on mean browsing time. For example, products D, E, and F are all products listed under the product category "Electronics." The mean browsing times for product webpages D, E, and F are 3 hours, 2 hours, and 1 hour, respectively. The access rank for the three product webpages is webpage D>webpage E>webpage F.

In some embodiments, access information accounts for total page views, transaction record, and mean browsing time. For example, in a situation where the transaction rate of product X is nearly the same as the transaction rate for product Y but the mean browsing time for product webpage X is greater than the mean browsing time for product webpage Y, the access rank for the product webpages is webpage X>webpage Y.

At 206, primary font information of the product webpage occupying the highest position in the access rank determined at 204 is extracted. To continue the earlier examples, for product webpages A, B, and C in product category "Women's Apparel," the server extracts the primary font information of product webpage C. For product webpages D, E, and F in product category "Electronics," the server extracts the primary font information of product webpage D.

In various embodiments, a single product webpage may contain multiple fonts. In some embodiments, primary font information refers to the one or more fonts that are used or appear most frequently in a product webpage. For example, if Times New Roman and Arial are the two most frequently used fonts in product webpage C, the primary font information for product webpage C includes Times New Roman and Arial. If the most frequently used font for product webpage D is Songti, then the primary font information for product webpage D includes Songti.

At 208, a predetermined correspondence is established between the product category and the primary font information extracted at 206. In the previous examples, the server establishes a predetermined correspondence between Electronics and Songti, and a predetermined correspondence between Women's Apparel and Times New Roman and Arial. In some embodiments, a predetermined correspondence between a product category and one or more fonts can also be established directly based at least in part on historical data. In some embodiments, the predetermined correspondences between product categories and fonts may be stored in an information bank. In some embodiments, the predetermined correspondences between product categories and fonts may be stored in an information bank as a table or as a file. Table 1 is an example that illustrates how the predetermined correspondences between product categories and fonts may be stored.

TABLE 1

| Product Category | Font |
| --- | --- |
| Women's apparel | Times New Roman, Arial |
| Electronics | Songti |
| Food | Times New Roman |

In various embodiments, the server determines the fonts that correspond to each product category based at least in part on access information. By providing the appropriate fonts, the server improves buyer-user experiences and increases transaction rates.

Figure 3:
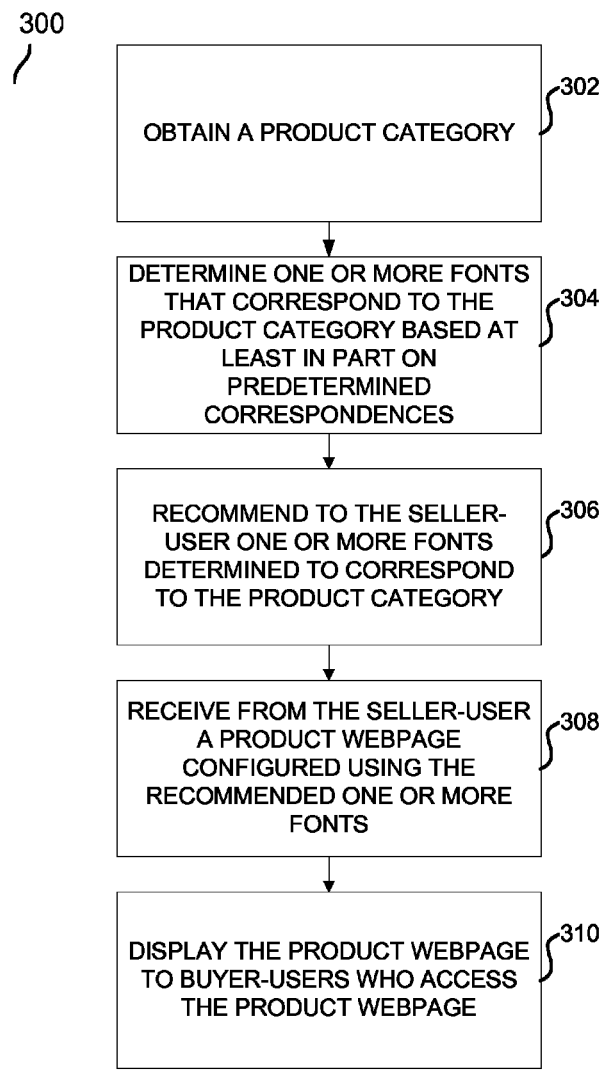
FIG. 3 is a flow diagram depicting an embodiment of the process for font recommendation.

FIG. 3 is a flow diagram depicting another embodiment of a process for font recommendation. Process 300 may be performed on system 100 (e.g., server 120) of FIG. 1. In some embodiments, fonts are recommended based at least in part on the predetermined correspondences between product categories and fonts that are stored in the information bank.

At 302, a product category is obtained. In some embodiments, the product category is determined based on a user selection of a product. For example, when a seller-user attempts to update or add merchandise information to his or her web storefront, the product category corresponds to the merchandise being updated or added. In some embodiments, the product category is sent directly by the seller-user.

At 304, one or more fonts that correspond to the received product category are determined based at least in part on predetermined correspondences between product categories and fonts. Based at least in part on the product category received at 302, the server is able to determine the fonts that correspond to the product category. In some embodiments, the fonts that correspond to the product category are determined via a lookup of the predetermined correspondences stored in Table 1.

At 306, one or more fonts determined to correspond to the product category are recommended to the seller-user. In some embodiments, the one or more fonts recommended to the seller-user include typeface information (e.g., Times New Roman or Songti). In some embodiments, the one or more fonts recommended to the seller-user include additional size and style information (e.g., 24-point bold Arial or 16-point italicized Kaiti).

In some embodiments, the server selects a stored font file and sends the selected font file to the seller-user. In some embodiments, each font file corresponds to a different typeface (e.g., Times New Roman or Songti). In some embodiments, each font file also conveys the size and/or style of a typeface (e.g., 24-point bold Arial or 16-point italicized Kaiti). In some embodiments, font files are stored in an information bank. In some embodiments, font files are stored in the same information bank as the predetermined correspondences between product categories and fonts. Because font files are also stored in the information bank, the server is able to select and send the relevant font file as soon as a font is determined for the product category.

At 308, a product webpage that is configured using the recommended fonts is received from the seller-user.

In some embodiments, the server provides font identifiers to the seller-user. For example, a seller-user can configure his or her product webpage by selecting the font files that correspond to the font identifiers. In some embodiments, font files are stored at the seller-user. In some embodiments, after font identifiers are received at the seller-user, font files stored at the seller-user may be selected to configure a product webpage based on the received font identifiers. In various embodiments, the contents of the product webpage can be any combination of text or graphics.

In some embodiments, font files are sent by the server to the seller-user and the seller-user then directly uses the font files to configure his or her product webpage. In some embodiments, one font file sent to the seller-user may correspond to multiple fonts and a seller-user may select one of the fonts in the font file for his or her product webpage. In some embodiments, multiple font files are sent to the seller-user and the seller-user can select one of the font files for his or her product webpage.

In some embodiments, after the product webpage has been generated, the seller-user submits the product webpage configured with the recommended font to the server.

At 310, a product webpage configured according to the font recommendation is displayed to a buyer-user who accesses the product webpage.

In some embodiments, the stored correspondences between product categories and fonts facilitate the determination of at least one appropriate font. Provided with a product category from the seller-user, font identifiers are sent to the seller-user to help the seller-user configure his or her product webpage with the appropriate fonts. In addition to customization, a product webpage with the appropriate fonts improves buyer-user experiences and increases transaction rates.

Figure 4:
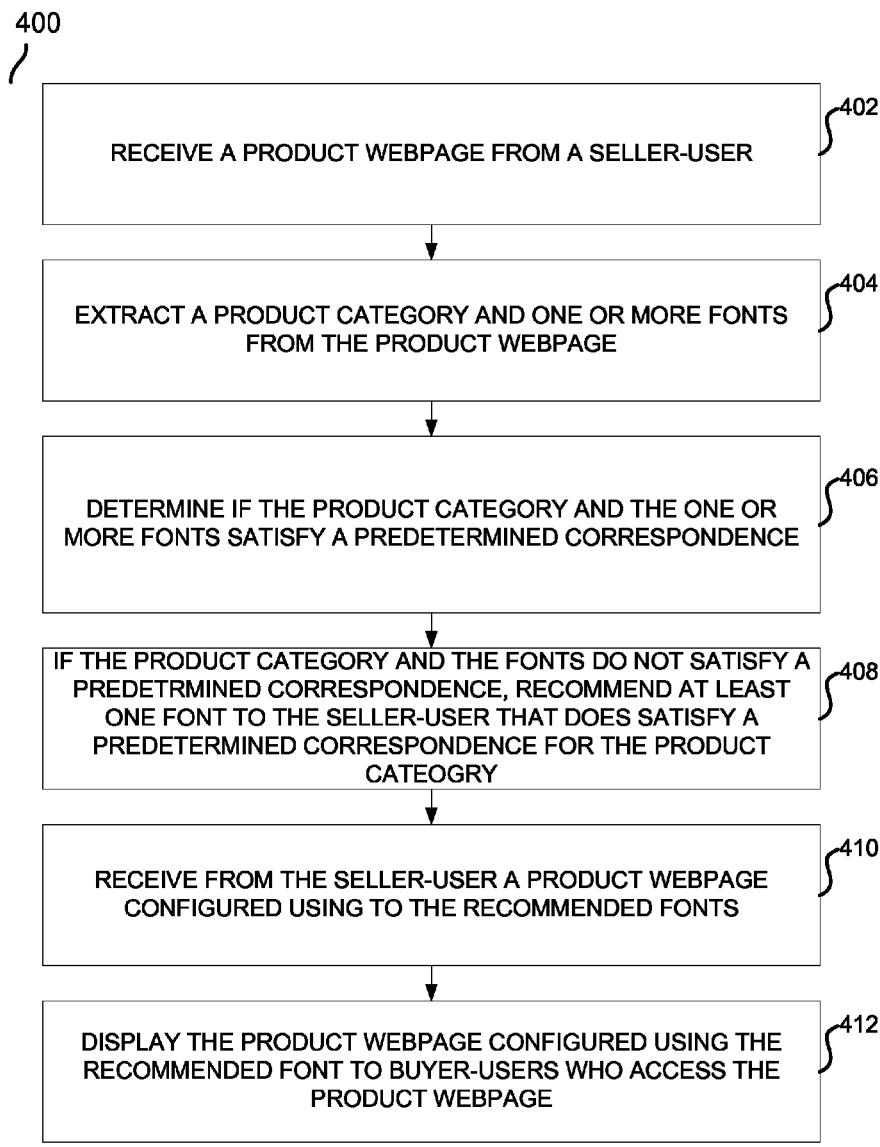
FIG. 4 is a flow diagram depicting an embodiment of the process for font recommendation.

FIG. 4 is a flow diagram depicting another embodiment of a process of font recommendation. In various embodiments, fonts are recommended based at least in part on the predetermined correspondences between product categories and fonts that are stored in the information bank.

At 402, a product webpage from a seller-user is received. For example, a seller-user may input the product webpage at a web browser.

At 404, a product category and one or more fonts are extracted from the product webpage received at 402. In some embodiments, analysis of the product webpage content provides information on the product category and the fonts for the webpage.

At 406, whether a predetermined correspondence exists between the product category and the one or more fonts extracted at 404 is determined. In some embodiments, if the product category and the fonts extracted at 404 satisfy a predetermined correspondence (e.g., the existing font is deemed to be a good or optimal font for the product category), then process 400 terminates at 406. In some embodiments, whether the product category and fonts extracted at 404 satisfy a predetermined correspondence may be determined based at least in part on the predetermined correspondences between product categories and fonts stored in Table 1. For example, according to Table 1, if the product category is "Women's Apparel" and the font extracted from the product webpage is Times New Roman, then a predetermined correspondence is satisfied. If, however, the font extracted from the product webpage is Calibri, then there is no predetermined correspondence according to Table 1.

At 408, in the event that there is no predetermined correspondence between the product category and the one or more fonts extracted at 404, at least one font that does satisfy a predetermined correspondence for the product category is recommended to the seller-user. In some embodiments, the server can send to the seller-user a font file identifier for a font that corresponds to the product category. In some embodiments, the server can send the font file for a font that corresponds with the product category to the seller-user.

In some embodiments, font recommendations are only made to a seller-user if the number of product webpages in a product category with fonts that do not satisfy predetermined correspondences exceeds a preset threshold. In some embodiments, the preset threshold could be a ratio, a percentage, or an absolute numeric value. For example, a seller-user has a total of ten product webpages. Of those ten product webpages, six product webpages do not satisfy any predetermined correspondences while four product webpages do. If the preset threshold is set at 50%, then the server makes font recommendations to the seller-user. However, if the preset threshold value is set at 80%, then the server would not make any font recommendations to the seller-user.

At 410, a product webpage configured according to the font recommendation provided at 408 is received from the seller-user. In some embodiments, the server stores this newly configured webpage, replacing the originally configured product webpage that was previously received at 402. For example, a seller-user had initially configured a product webpage for an item listed under Women's Apparel with the font Lucida. There is no predetermined correspondence between the product category Women's Apparel and the font Lucida. A new product webpage is configured using Times New Roman, which is recommended based on its predetermined correspondence with Women's Apparel. A new product webpage configured using Times New Roman is sent to the server and the server stores the new product webpage in place of the original product webpage configured using Lucida.

At 412, the product webpage received at 410, which has been configured according to the font recommendation, is displayed to a buyer-user who accesses the product webpage.

In some embodiments, the server will recommend to a seller-user at least one font that corresponds to the product category if the seller-user had initially configured his or her product webpage with fonts that do not conform to the established font-product category correspondences. The seller-user is able to configure his or her product webpage with the appropriate fonts. In addition to customization, a product webpage with the appropriate fonts improves buyer-user experiences and increases transaction rates.

Figure 5:
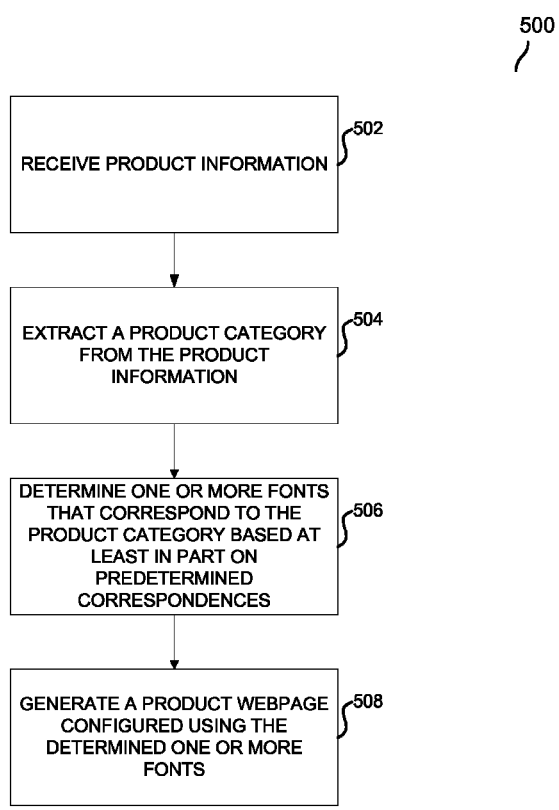
FIG. 5 is a flow diagram depicting an embodiment of the process for generating product webpages containing font information.

FIG. 5 is a flow diagram depicting an embodiment of a process 500 for generating product webpages containing font information.

At 502, product information is received at the server. In some embodiments, product information can include a description of the product. In some embodiments, the server determines a product category for the product based at least in part on the product description. For example, product information includes at least one keyword that relates to the product and this keyword may be used in determining a product category. In some embodiments, product information includes a product category (e.g., as an identifier according to a predetermined scheme).

At 504, a product category is extracted from the product information received at 502. In some embodiments, when the product information includes at least one keyword for the product, the server can query a product bank using this keyword and determine an appropriate product category for the product. In some embodiments, the product bank is a database that stores product keywords, product categories, and relationships (e.g., mappings) between product keywords and categories. In some embodiments, when the product information includes product category, the server can directly extract the product category.

At 506, one or more fonts that correspond to the product category obtained at 504 are determined based at least in part on the predetermined correspondences between product categories and fonts.

At 508, a product webpage configured using the one or more fonts determined at 506 is generated. In some embodiments, given the predetermined correspondences between product categories and fonts, product webpages are automatically generated with suitable fonts (e.g., by inserting font tags with the appropriate attributes for typeface, size, and style in the HTML representation of each product webpage). Because product webpages for different products can be automatically customized with the proper fonts, a seller-user who has multiple products to list avoids having to perform multiple operations to configure each product webpage individually. As a result, the load on the server is reduced and user experience is improved.

Figure 6:
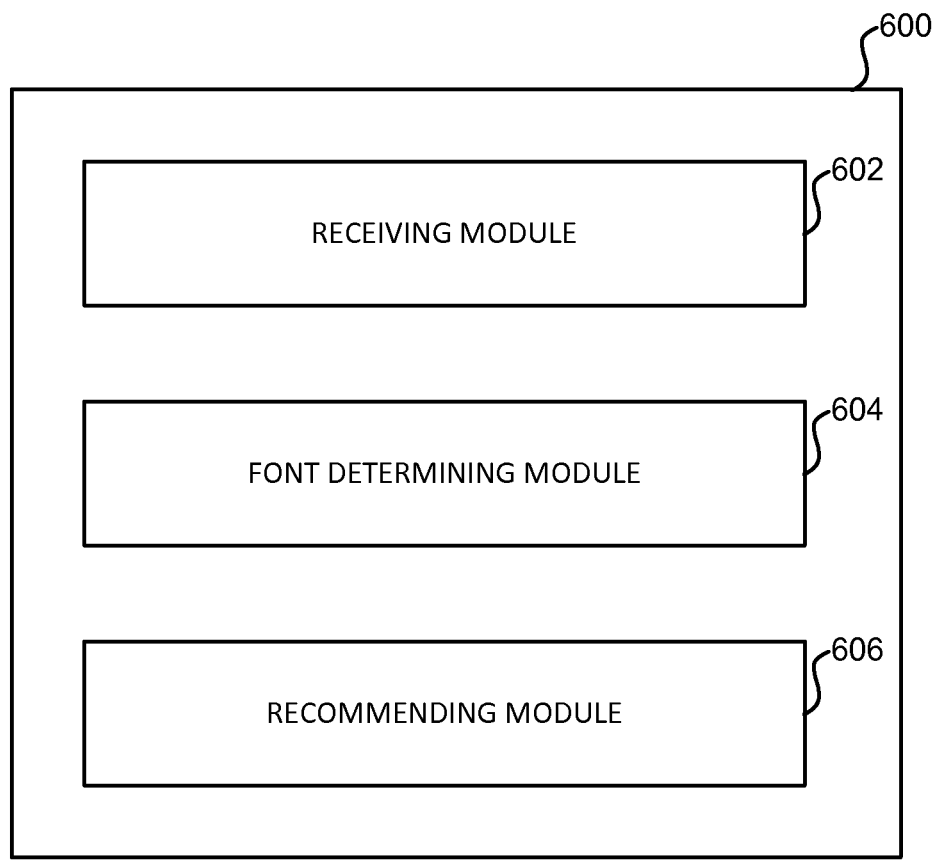
FIG. 6 is a block diagram depicting an embodiment of the font recommendation system.

FIG. 6 is a block diagram depicting an embodiment of the font recommendation system 600. As shown in FIG. 6, the font recommendation system 600 includes: a receiving module 602, for receiving product category from a seller-user and for receiving webpages generated by the seller-user; a font determining module 604, for determining the one or more fonts that correspond to the product category based at least in part on predetermined correspondences; and a recommending module 606, for recommending fonts to the seller-user.

Figure 7:
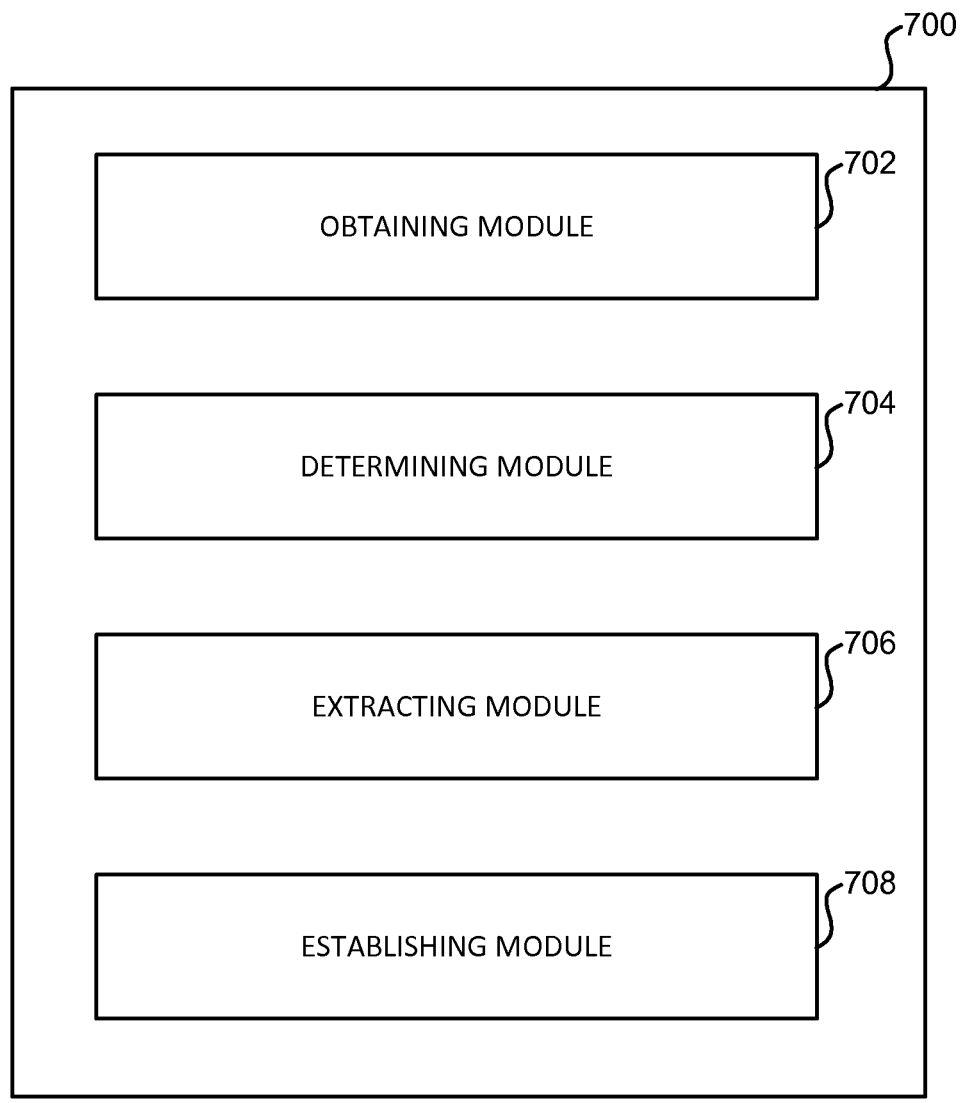
FIG. 7 is a block diagram depicting an embodiment of the system for determining correspondences between product category and fonts.

FIG. 7 is a block diagram depicting an embodiment of the system 700 for establishing correspondences between product category and fonts. As shown in FIG. 7, system 700 includes: an obtaining module 702, for obtaining access information of product webpages for products in a particular product category; a determining module 704, for determining access rank based at least in part on access information for the product webpage; an extracting module 706, for extracting and determining the primary font information of the product webpage with the highest access rank; and an establishing module 708, for establishing a predetermined correspondence between the product category and primary font information.

Figure 8:
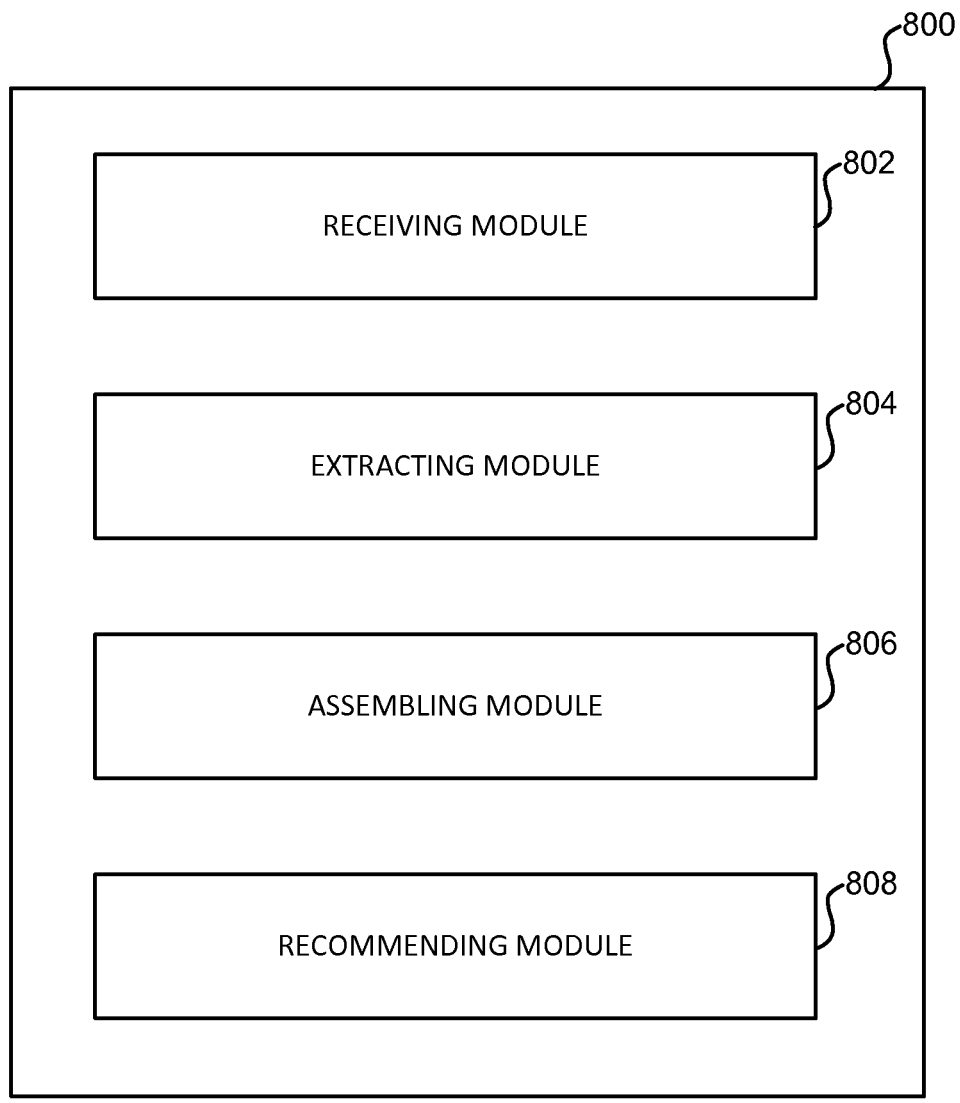
FIG. 8 is a block diagram depicting an embodiment of the font recommendation system.

FIG. 8 is a block diagram depicting an embodiment of the font recommendation system 800. As shown in FIG. 8, font recommendation system 800 includes: a receiving module 802, for receiving product webpages from seller-users; an extracting module 804, for extracting product categories and fonts from product webpages; an assessing module 806, for assessing whether the extracted product categories and fonts satisfy any predetermined correspondences; and a recommending module 808, for recommending at least one font that does correspond to the product category to the seller-user if an extracted product category and fonts fail to satisfy a predetermined correspondence.

Figure 9:
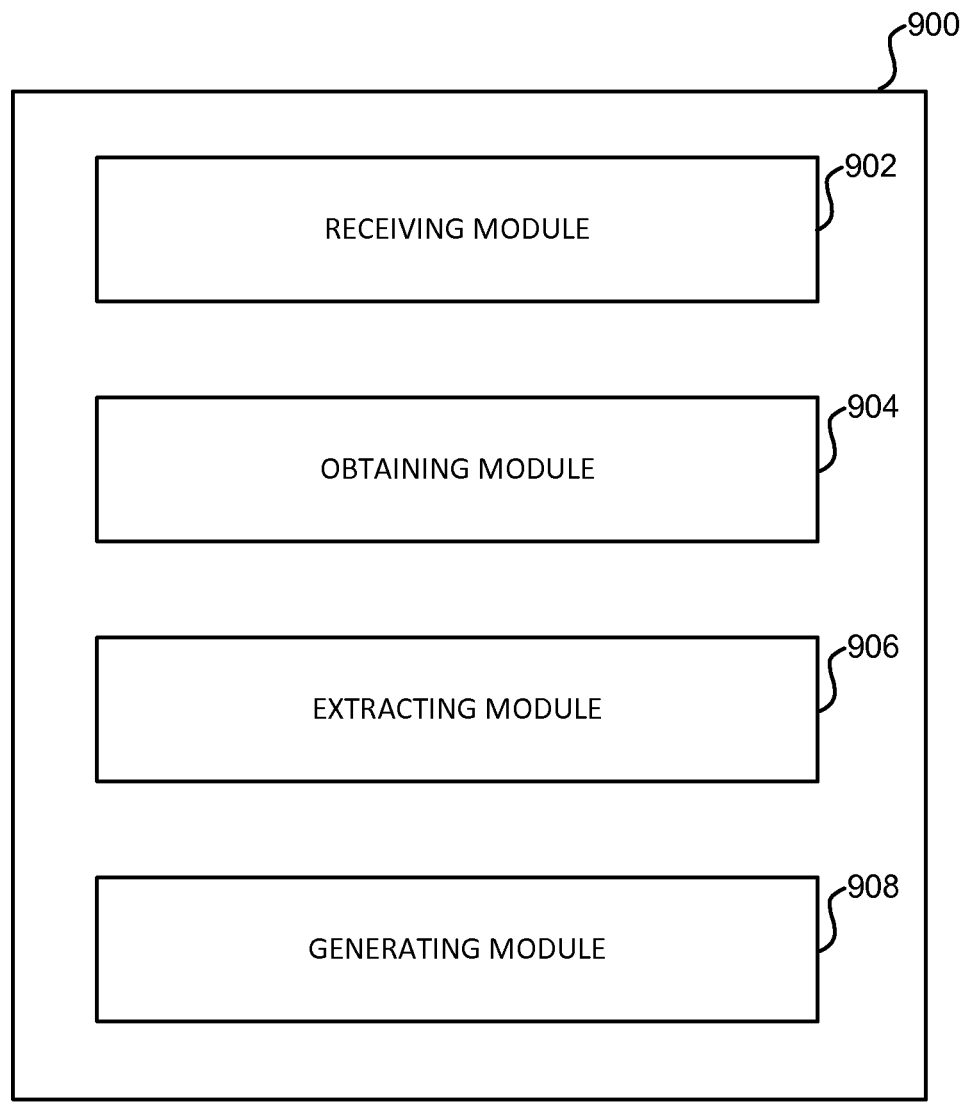
FIG. 9 is a block diagram depicting an embodiment of the system for generating webpages containing font information.

FIG. 9 is a block diagram depicting an embodiment of the system 900 for generating webpages containing font information. As shown in FIG. 9, system 900 includes: a receiving module 902, for receiving product information; an obtaining module 904, for obtaining product categories from the received product information; an extracting module 906, for extracting font information that corresponds to the extract product categories; and a generating module 908, for generating webpages based on the font information.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for font recommendation, comprising:
obtaining a product category;
determining, using one or more processors, whether a font recommendation should be made with respect to the product category; and
in the event that the font recommendation should be made:
determining a recommended font that corresponds to the product category, the determination being based at least in part on a plurality of predetermined correspondences, and the plurality of predetermined correspondences indicating associations between a plurality of product categories and a respective plurality of fonts; and
outputting information pertaining to the recommended font,
wherein the plurality of predetermined correspondences are established by:
obtaining access information for a plurality of webpages corresponding to a plurality of products under the product category wherein the access information includes one or more of: total page views, transaction record, and mean browsing time for each of the plurality of products;
determining, using one or more processors, an access rank for each of the plurality of webpages based at least in part on the access information for each of the plurality of webpages;

extracting a primary font information from the webpage with a highest access rank; and establishing a predetermined correspondence between the product category and the extracted primary font information.

2. The method of claim 1, further comprising:

receiving, from a user, product information, wherein the product category is extracted from the product information.

3. The method of claim 1, further comprising:

receiving, from a user, product information, wherein the product information includes a keyword and the product category is determined based at least in part on the keyword.

4. The method of claim 1, wherein determining whether the font recommendation should be made includes:

obtaining font information of a frequently used font within a webpage that corresponds to a product within the product category; and determining whether a predetermined correspondence exists between the product category and the frequently used font, including by looking up the product category and the frequently used font in the plurality of predetermined correspondences, wherein the font recommendation is to be made in the event that no predetermined correspondence is determined.

5. The method of claim 1, wherein determining whether the font recommendation should be made includes:

obtaining font information of a frequently used font within a webpage that corresponds to a product in the product category;

determining whether a predetermined correspondence exists between the product category and the frequently used font, including by looking up the product category and the frequently used font in the plurality of predetermined correspondences; and determining whether a number of webpages, for which no predetermined correspondence exists between their respective product categories and frequently used fonts, exceeds a threshold, wherein the font recommendation is to be made in the event that the threshold is exceeded.

6. The method of claim 1, wherein the access rank for a first product webpage and a second product webpage in the product category is determined by:

determining a first transaction rate for the first product webpage based at least in part on a ratio of a total page view for the first product webpage and a transaction record for the first product webpage;

determining a second transaction rate for the second product webpage based at least in part on a ratio of a total page view for the second product webpage and a transaction record for the second product webpage; and determining the access rank of the first product webpage and the access rank of the second product webpage based at least in part on a comparison of the first transaction rate and the second transaction rate.

7. The method of claim 1, wherein the access rank of a first product webpage and a second product webpage in the product category is determined based at least in part on a comparison of a first mean browsing time for the first product webpage and a second mean browsing time for the second product webpage.

8. The method of claim 1, wherein the access rank of a first product webpage and a second product webpage in the product category is determined by:

determining a first transaction rate for the first product webpage based at least in part on a ratio of a total page view for the first product webpage and a transaction record for the first product webpage;

determining a second transaction rate for the second product webpage based at least in part on a ratio of a total page view for the second product webpage and a transaction record for the second product webpage; and determining the access rank of the first product webpage and the access rank of the second product webpage based at least in part on a comparison of a first mean browsing time for the first product webpage weighed by the first transaction rate and a second mean browsing time for the second product webpage weighed by the second transaction rate.

9. The method of claim 1, further comprising, in the event that the font recommendation should be made, generating a replacement webpage based on the webpage that was originally configured by the user and the recommended font.

10. The method of claim 1, wherein the product category is based at least in part on a user selection of a product.

11. A system for font recommendation comprising:

one or more processors configured to:

obtain a product category;

determine whether a font recommendation should be made with respect to the product category; and in the event that the font recommendation should be made:

determine a recommended font that corresponds to the product category, the determination being based at least in part on a plurality of predetermined correspondences, and the plurality of predetermined correspondences indicating associations between a plurality of product categories and a respective plurality of fonts; and output information pertaining to the recommended font, wherein the plurality of predetermined correspondences are established by the one or more processors further configured to:

obtain access information for a plurality of webpages corresponding to a plurality of products under the product category, wherein the access information includes one or more of: total page views, transaction record, and mean browsing time for each of the plurality of products;

determine an access rank for each of the plurality of webpages based at least in part on the access information for each of the plurality of webpages;

extract a primary font information from the webpage with a highest access rank; and establish a predetermined correspondence between the product category and the extracted primary font information; and a memory coupled to the one or more processors and configured to provide the processor with instructions.

12. The system of claim 11, wherein the one or more processors are further configured to:

receive, from a user, product information, wherein the product category is extracted from the product information.

13. The system of claim 11, wherein the one or more processors are further configured to:

receive, from a user, product information, wherein the product information includes a keyword and the product category is determined based at least in part on the keyword.

14. A system of claim 11, wherein to determine whether the font recommendation should be made, the one or more processors are further configured to:
- obtain font information of a frequently used font within a webpage that corresponds to a product in the product category; and
- determine whether a predetermined correspondence exists between the product category and the frequently used font, including by looking up the product category and the frequently used font in the plurality of predetermined correspondences, wherein the font recommendation is to be made in the event that no predetermined correspondence is determined.

15. The system in claim 11, wherein to determine whether the font recommendation should be made, the one or more processors are further configured to:
- obtain font information of a frequently used font within a webpage that corresponds to a product in the product category;
- determine whether a predetermined correspondence exists between the product category and the frequently used font, including by looking up the product category and the frequently used font in the plurality of predetermined correspondences; and
- determine whether a number of webpages, for which no predetermined correspondence exists between their respective product categories and frequently used fonts, exceeds a threshold, wherein the font recommendation is to be made in the event that the threshold is exceeded.

16. The system of claim 11, wherein to determine the access rank for a first product webpage and a second product webpage in the product category, the one or more processors are further configured to:
- determine a first transaction rate for the first product webpage based at least in part on a ratio of a total page view for the first product webpage and a transaction record for the first product webpage;
- determine a second transaction rate for the second product webpage based at least in part on a ratio of a total page view for the second product webpage and a transaction record for the second product webpage; and
- determine the access rank of the first product webpage and the access rank of the second product webpage based at least in part on a comparison of the first transaction rate and the second transaction rate.

17. The system of claim 11, wherein the one or more processors are further configured to determine the access rank of a first product webpage and a second product webpage in the product category based at least in part on a comparison of a first mean browsing time for the first product webpage and a second mean browsing time for the second product webpage.

18. The system of claim 11, wherein to determine the access rank of a first product webpage and a second product webpage in the product category, the one or more processors are further configured to:
- determine a first transaction rate for a first product webpage based at least in part on a ratio of a total page view for the first product webpage and a transaction record for the first product webpage;
- determine a second transaction rate for a second product webpage based at least in part on a ratio of a total page view for the second product webpage and a transaction record for the second product webpage; and
- determine the access rank of the first product webpage and the access rank of the second product webpage based at least in part on a comparison of a first mean browsing time for the first product webpage weighed by the first transaction rate and a second mean browsing time for the second product webpage weighed by the second transaction rate.

19. The system of claim 11, wherein the one or more processors are further configured to generate, in the event that the font recommendation should be made, a replacement webpage based on the webpage that was originally configured by the user and the recommended font.

20. The system of claim 11, wherein the product category is based at least in part on a user selection of a product.

\* \* \* \* \*

UNITED STATES PATENT AND TRADEMARK OFFICE
CERTIFICATE OF CORRECTION

| | | |
|---|---|---|
| PATENT NO. | : 8,990,684 B2 | Page 1 of 1 |
| APPLICATION NO. | : 13/495331 | |
| DATED | : March 24, 2015 | |
| INVENTOR(S) | : Gao et al. | |

It is certified that error appears in the above-identified patent and that said Letters Patent is hereby corrected as shown below:

Title Page drawing, box with reference number 208, delete "CATEOGRY" and insert --CATEGORY-- therefor.

In the Drawings

In figure 2, box with reference number 208, delete "CATEOGRY" and insert --CATEGORY-- therefor.

Signed and Sealed this
Twelfth Day of July, 2016

Michelle K. Lee
*Director of the United States Patent and Trademark Office*